Patented Sept. 5, 1950

2,521,307

UNITED STATES PATENT OFFICE 2,521,307

HALOGENATED NITROALKANE SULFONATES AND METHOD OF MAKING SAME

Percy B. Polen, Chicago, Ill., assignor to The Visking Corporation, Chicago, Ill., a corporation of Virginia No Drawing. Application September 11, 1947, Serial No. 773,507

4 Claims. (Cl. 260—513)

This invention relates to new chemical compounds and to the method of making the same. More particularly, it relates to halogenated nitroalkane sulfonates and to the method of making the same.

$\beta$-nitroalkane sulfonates have been recently prepared by a method which, in general, consisted in reacting a nitro olefin with an aqueous alkaline bisulfite solution having a pH of at least 5.4, and preferably within the range of 6 to 7. Attempts have been made to halogenate such $\beta$-nitroalkane sulfonates by various methods, such as in acetic acid solution, in aqueous systems with simultaneous addition of alkali, etc., but in no case was a halogenated nitroalkane sulfonate obtained.

An object of this invention is to provide new chemical compounds.

Another object of this invention is to provide new halogenated nitroalkane sulfonates.

An additional object of this invention is to provide halogenated nitroalkane sulfonates wherein the carbon atom which carries the nitro group also carries the halogen and another substituent group.

An additional object of this invention is to provide a new and improved method of preparing the above-mentioned compounds.

Other and additional objects will become apparent hereinafter.

The objects of the invention are accomplished, in general, by converting a $\beta$-nitroalkane sulfonate to the corresponding enol salt thereof and halogenating said enol salt. Generally in practice, the two steps are carried out in an aqueous system, such as water, and halogenation effected on the enol salt in neutral form.

The enolization of the nitroalkane sulfonate is effected by adding an equivalent amount of an appropriate alkali to the aqueous system containing the nitroalkane sulfonate and permitting the nitroalkane sulfonate to enolize. Complete enolization is obtained in about 15 to 30 minutes, and the rate of enolization is followed by watching the pH of the solution. When the pH is within the range of 7 to 7½, enolization is complete and thereafter the halogenation step is carried out.

It is important that the nitro group be completely enolized before halogenation. If the halogen were added before the nitro group had been completely enolized, such as when the pH is in the range above 8, for example 8 to 11, a hypohalite is formed. Such hypohalite, being a strong oxidizing agent, causes oxidative degradation of the nitrosulfonate and the desired product will not be obtained.

The details and manner of practicing the invention will become apparent by reference to the following specific examples, it being understood that these examples are merely illustrative embodiments of the invention and that the scope of the invention is not limited thereto:

EXAMPLE I

*Potassium-2-nitro-2-bromobutane-1-sulfonate*

A well stirred suspension of 442 grams of potassium-2-nitrobutane-1-sulfonate in 2 liters of water was cooled to 0°–5° C. and a solution of 132 grams 85% potassium hydroxide in 200 cc. of water added all at one time. The nitrosulfonate dissolved and the pH of the solution gradually began to drop. After 20 minutes, the pH had dropped to 7.5. Then 320 grams of bromine was added dropwise over a period of 100 minutes. The temperature of the reaction mixture was 0°–5° C. and the pH held constantly over most of the reaction but toward the end of the addition it dropped to 6. As the bromination proceeded, a white crystalline precipitate separated from solution. At the end of the reaction, a slight excess of bromine was removed by addition of sulfur-dioxide. The crystalline product, after filtering and being air-dried, weighed 534 grams (89% theoretical yield). After recrystallization from a water-alcohol solution, the pure product melted at 199.5°–200° C. with decomposition. Analysis calculated for potassium: found 13.5%; theory 13.0%; bromine: found 27.5%; theory 26.7%.

EXAMPLE II

*Potassium-2-nitro-2-iodobutane-1-sulfonate*

The solution of enol salt of potassium-2-nitrobutane-1-sulfonate was prepared as in Example I. Then an equivalent amount of iodine dissolved in carbon tetrachloride was added to the reaction mixture, the temperature of which was 0°–5° C. The light yellow crystalline product which separated was removed by filtration, sucked dry, and washed with ether to remove traces of iodine. The yield of product was 70% of theoretical without working up the mother liquors. The compound was purified for analysis by recrystallization from alcohol and water and melted with decomposition at 156° C. Analysis calculated for potassium: 11.2%; found 11.0%; iodine: 36.6%; found 36.4%.

EXAMPLE III

*Potassium-2-nitro-2-chlorobutane-1-sulfonate*

The reaction was carried out as in Example I with the exception that chlorine was bubbled into the solution instead of bromine. Chlorine addition was halted when the pH reached 6. A yield of 73.6% of product was obtained without working up the mother liquors. The compound recrystallized for analysis melted with decomposition at 208° C. Analysis calculated for potassium: 15.3%; found 15.2%; chlorine: 13.9%; found 14.1%.

EXAMPLE IV

*Potassium-1-nitro-1-bromo-2-phenylethane-2-sulfonate*

A potassium enol salt of 6.2 grams potassium-1-nitro-2-phenylethane-2-sulfonate was prepared as described in Example I. After stirring 20 minutes, the pH was 7.3. To this solution, cooled to 3° C., was added 1.28 cc. of bromine over a period of 20 minutes. The white crystalline product which separated was isolated by filtration and was washed and dried to yield 6.0 grams (54.8% yield) of product. No attempt was made to work up the mother liquors. The product recrystallized for analysis from water, melted with decomposition at 226°–227° C. Analysis calculated for bromine: 23.0%; found 23.0%; sulfur: 9.2%; found 9.0%.

EXAMPLE V

*Potassium-1-nitro-1,1-dibromo-2-phenylethane-2-sulfonate*

A solution of the enol salt of 2.7 grams of potassium-1-nitro-1-bromo-2-phenylethane-2-sulfonate, prepared in Example IV, was made by dissolving in 25 cc. water and 10.9 cc. of 0.854 N potassium hydroxide. The mixture was cooled to 3°–5° C. and stirred 20 minutes until the pH reached 7.5. Then 0.40 cc. of bromine was added dropwise and the product separated upon strong cooling and scratching of the sides of the container. Recrystallization for analysis from water gave 0.55 gram white crystals melting with decomposition at 195°–195.2° C. Analysis calculated for bromine: 37.5%; found 36.2%; potassium: 9.1%; found 9.0%.

EXAMPLE VI

*Potassium-2-bromopropane-1-sulfonate*

This compound was prepared from potassium-2-nitropropane-1-sulfonate in the same manner as the corresponding butane derivative of Example I in 72% yield. Recrystallization for analysis from alcohol-water gave white crystals melting with decomposition at 211°–211.5° C. Analysis calculated for bromine: 28.0%; found 27.2%; sulfur: 11.2%; found 10.8%.

EXAMPLE VII

*Potassium-1-nitro-1,1-dibromoethane-2-sulfonate*

A solution of the enolate salt of 19.3 grams potassium-1-nitroethane-2-sulfonate in 50 cc. water was cooled to 3°–5° C. and stirred for 25 minutes. The pH was adjusted with a little acid to 7.0 to 7.5 and then 16.0 grams of bromine were added dropwise over 15 minutes. The resulting solution was concentrated under reduced pressure and, after cooling, a crystalline product separated. The precipitate recrystallized several times from water, melted with decomposition at 209°–209.5° C. Analysis indicated that two atoms of bromine had been substituted in the molecule instead of the one that was expected. Analysis calculated for bromine: 45.6%; found 44.3%; potassium: 11.1%; found 11.2%.

In the examples, the melting points were obtained by means of a melting point block, and are uncorrected.

The halogenated nitroalkane sulfonates of this invention are characterized in that the carbon atom which is attached to the carbon atom carrying the sulfonic acid group also carries (1) the nitro group, (2) the halogen, and (3) another substituent group. Such other substituent group is the same as the corresponding group in the nitroalkane sulfonate which is treated in accordance with this invention. It can be a halogen, such as chlorine, bromine or iodine; an alkyl group, such as methyl, ethyl, propyl, butyl, etc.; a cycloalkyl, such as cyclopentyl, cyclohexyl, etc.; an aromatic group, such as phenyl, naphthyl, nitro phenyl, chlorophenyl, etc.; an aralkyl group, such as benzyl, etc.; an alkoxy group, such as methoxy, ethoxy, butoxy; an aryloxy group, such as phenyloxy, naphthyloxy, etc.; an aralkoxy group, such as benzyloxy, etc.

The halogenated nitroalkane sulfonates of this invention are further characterized in that each of the remaining two valences of the carbon atom, which is attached to the sulfonic acid group, is satisfied by H or a substituent group, depending on the nature of the initial nitroalkane sulfonate which is treated by the process. Such substituent group or groups can, for example, be a halogen, such as chlorine, bromine or iodine; an alkyl group, such as methyl, ethyl, propyl, butyl, etc.; a cycloalkyl, such as cyclopentyl, cyclohexyl, etc.; an aromatic group, such as phenyl, naphthyl, nitro phenyl, chlorophenyl, etc.; an aralkyl group, such as benzyl, etc.; an alkoxy group, such as methoxy, ethoxy, butoxy; an aryloxy group, such as phenyloxy, naphthyloxy, etc.; an aralkoxy group, such as benzyloxy, etc. In general, the halogenated nitroalkane sulfonates of this invention can be illustrated by the following general formula:

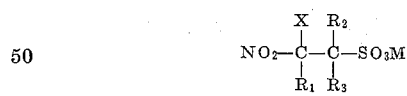

wherein:

X is a halogen selected from the group consisting of chlorine, bromine and iodine;

$R_1$ is selected from the group consisting of halogen, such as chlorine, bromine or iodine; an alkyl group, such as methyl, ethyl, propyl, butyl, etc.; a cycloalkyl, such as cyclopentyl, cyclohexyl, etc.; an aromatic group, such as phenyl, naphthyl, nitro phenyl, chlorophenyl, etc.; an aralkyl group, such as benzyl, etc.; an alkoxy group, such as methoxy, ethoxy, butoxy; an aryloxy group, such as phenyloxy, naphthyloxy, etc.; an aralkoxy group, such as benzyloxy, etc.

$R_2$ and $R_3$ are selected from the group consisting of H and the group set forth in $R_1$; and M is any metal, such as an alkali metal, for example, sodium and potassium, calcium, magnesium, zinc; ammonium; or any of the following N-substituted ammonium ions: any alkaloid, methyl ammonium, dimethyl ammonium, trimethyl ammonium, methyl dibenzyl ammonium, dimethyl benzyl ammonium, diethyl phenyl ammonium, cetyl dimethyl ammonium, quinolinium, pyridinium, morpholine, N-methyl morpholine, ethyl diethanol ammonium, triethanol ammonium, piperidinium, N-methyl piperidinium, etc.

The following are illustrative examples of the numerous halogenated nitroalkane sulfonates of this invention:

Sodium-2,2-dichloro-2-nitroethane-1-sulfonate
Sodium - 2 - chloro - 2 - bromo - 2 - nitroethane-1-sulfonate
Sodium - 1 - chloro - 1 - iodo - 1 - nitropropane-2-sulfonate
Sodium-1,1-dibromo-1-nitropentane-2-sulfonate
Potassium - 1,1 - dibromo - 1 - nitro - 2 - phenylethane-2-sulfonate
Potassium-2-chloro-2-nitrobutane-1-sulfonate
Potassium-2-bromo-2-nitrobutane-1-sulfonate
Potassium-2-iodo-2-nitrobutane-1-sulfonate
Potassium - 2 - bromo - 2 - cyclohexyl - 2 - nitroethane-1-sulfonate
Sodium - 1 - iodo - 1 - cyclopentyl - 1 - nitropropane-2-sulfonate
Sodium - 1 - chloro - 1 - phenyl - 1 - nitro - 2 - methoxyethane-2-sulfonate
Sodium - 1 - bromo - 1 - ( - 1 - naphthyl) - 1 - nitro-2-ethoxypropane-2-sulfonate
Potassium - 1 - iodo - 1 - phenyl - 2 - nitro - 2 - phenylethane-2-sulfonate
Potassium - 2 - chloro - 2 - benzyloxy - 2 - nitro-1-cyclohexylethane-1-sulfonate
Potassium - 4 - bromo - 4 - phenoxy - 4 - nitrobutane-3-sulfonate
Potassium - 1,1,2,2 - tetrachloro - 2 - nitroethane-1-sulfonate
Ammonium - 5 - iodo - 5 - ethoxy - 5 - nitro - 4 - chloropentane-4-sulfonate
Ammonium - 5 - chloro - 5 - phenyl - 5 - nitro - 4 - ethylpentane-4-sulfonate
Sodium-4-bromo-4-nitro-5-phenylhexane-3-sulfonate
Sodium - 1 - chloro - 1 - bromo - 1 - nitro - 3 - phenylpropane-2-sulfonate Any β-nitroalkane sulfonate which has a hydrogen atom connected to the carbon atom bearing the nitro group can be employed in the process. The β-nitroalkane sulfonate can be substituted depending on the halogenated nitroalkane desired. In the preferred form, the carbon atom which carries the nitro group also carries a substituent group. The nature of such substituent group is not important or critical so far as this invention is concerned. Thus, such substituent group can be a halogen, such as chlorine, bromine or iodine; an alkyl group, such as methyl, ethyl, propyl, butyl, etc.; a cycloalkyl, such as cyclopentyl, cyclohexyl, etc.; an aromatic group, such as phenyl, naphthyl, nitro phenyl, chlorophenyl, etc.; an aralkyl group, such as benzyl, etc; an alkoxy group, such as methoxy, ethoxy, butoxy; an aryloxy group, such as phenyloxy, naphthyloxy, etc.; an aralkoxy group, such as benzyloxy, etc.

Each of the remaining two valences of the carbon atom which carries the sulfonic acid group and which is attached to the carbon atom carrying the nitro group can be satisfied by H or a substituent group. The nature of such substituent group or groups (which are attached to the carbon atom which carries the sulfonic acid group) is not critical insofar as the process is concerned. Thus, such substituent group or groups can be halogen, such as chlorine, bromine or iodine; an alkyl group, such as methyl, ethyl, propyl, butyl, etc.; a cycloalkyl, such as cyclopentyl, cyclohexyl, etc.; an aromatic group, such as phenyl, naphthyl, nitro phenyl, chlorophenyl, etc.; an aralkyl group, such as benzyl, etc.; an alkoxy group, such as methoxy, ethoxy, butoxy; an aryloxy group, such as phenyloxy, naphthyloxy, etc.; an aralkoxy group, such as benzyloxy, etc.

In the preferred form of the invention, there is used an alkali metal salt of a β-nitroalkane sulfonic acid in which the carbon atom to which the carbon atom carrying the sulfonic acid radical is attached also carries the nitro group, a hydrogen, and a substituent group, and each of the other two valences of the carbon atom which carries the sulfonic acid group is satisfied by either H or a substituent group. The preferred nitroalkane sulfonate can be represented by the following general formula:

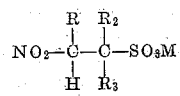

wherein:
R is a substituent group, such as above set forth;
$R_2$ and $R_3$ are either H or a substituent group, as above set forth; and
M is an alkali metal.

The following are illustrative examples of β-nitroalkane sulfonates which can be used in the process:

Sodium-2-nitroethane-1-sulfonate
Potassium-2-nitropropane-1-sulfonate
Sodium-2-nitrobutane-1-sulfonate
Potassium-2-nitrobutane-3-sulfonate
Sodium-2-nitro-1-phenylethane-1-sulfonate
Potassium-2-nitro-2-phenylethane-1-sulfonate
Sodium-1-nitropropane-2-sulfonate
Potassium-2-chloro-2-nitroethane-1-sulfonate
Sodium-1-bromo-1-nitropropane-2-sulfonate
Potassium-2-iodo-2-nitro - 1 - phenylethane - 1 - sulfonate
Sodium-2-nitro-3-phenylbutane-3-sulfonate
Sodium-1-phenyl - 1 - nitro-2-methoxyethane-2-sulfonate
Sodium-1-(1-naphthyl) - 1 - nitro-2-ethoxypropane-2-sulfonate
Potassium - 2 - benzyloxy - 2-nitro-1-cyclohexylethane-1-sulfonate
Potassium-4-phenoxy-4 - nitrobutane - 3 - sulfonate
Potassium 1, 1, 2-trichloro-2-nitroethane-1-sulfonate
Ammonium - 5-ethoxy-5-nitro-4-chloropentane-4-sulfonate Additional β-nitroalkane sulfonates which can be used in this process are disclosed in copending application Serial No. 656,788, filed March 23, 1946.

The halogen can be added to the system in any convenient manner. Preferably, the halogen is added in a manner which will not introduce substances which will enter into side reactions.

The reaction is preferably carried out at atmospheric pressure and at a low temperature, such as ice-bath temperatures (0°–5° C.) so that the product crystallizes out as it is formed. Due to the use of the low temperatures, the possibility of side reactions, such as degradative oxidation, which might occur at higher temperatures is avoided. However, the process is not restricted to the use of such low temperatures since the reaction can be performed at temperatures up to 50°–60° C. When such temperatures are utilized, after the halogenation step the reaction mixture is chilled to a low temperature, such as ice-bath temperatures (0°–5° C.) whereby the product will crystallize out.

Herein the term "enol salt" is used synonymously to "aci-nitro salt."

The invention provides new chemical compounds which are capable of use in the synthesis of numerous compounds. Likewise, the invention provides an efficient, readily controlled, and simple method of preparing the new compounds.

Since it is obvious that various changes and modifications may be made in the above description without departing from the nature or spirit thereof, this invention is not restricted thereto except as set forth in the appended claims.

I claim:

1. A method of making halogenated β-nitroalkane sulfonates which consists in adding a chemically equivalent amount of an alkali to an aqueous solution of a β-nitroalkane sulfonate in which the carbon atom carrying the nitro group also is bonded to hydrogen, permitting the pH of the system to change until the pH is within the range of 7 to 7.5 whereby the aci-nitro salt corresponding to said nitroalkane sulfonate is produced, halogenating said aci-nitro salt at a temperature of from 0°–60° C. with a halogen selected from the class consisting of chlorine, bromine, and iodine, and separating the resulting halogenated nitroalkane sulfonate from the mass.

2. A method of making halogenated β-nitroalkane sulfonates which consists in adding a chemically equivalent amount of an alkali to an aqueous solution of a β-nitroalkane sulfonate in which the carbon atom carrying the nitro group also is bonded to hydrogen, the pH of the system to change until the pH is within the range of 7 to 7.5 whereby the aci-nitro salt corresponding to said nitroalkane sulfonate is produced, halogenating said aci-nitro salt at a temperature of from 0°–5° C. with a halogen selected from the class consisting of chlorine, bromine, and iodine, and separating the resulting halogenated nitroalkane sulfonate from the mass.

3. A method of making halogenated β-nitroalkane sulfonates which consists in adding a chemically equivalent amount of an alkali metal hydroxide to an aqueous solution of a β-nitroalkane sulfonate in which the carbon atom carrying the nitro group also is bonded to hydrogen, the pH of the system to change until the pH is within the range of 7 to 7.5 whereby the aci-nitro salt corresponding to said nitro-alkane sulfonate is produced, halogenating said aci-nitro salt at a temperature of from 0°–60° C. with a halogen selected from the class consisting of chlorine, bromine, and iodine, and separating the resulting halogenated nitroalkane sulfonate from the mass.

4. A method of making halogenated β-nitroalkane sulfonates which consists in adding a chemically equivalent amount of an alkali metal hydroxide to an aqueous solution of a β-nitroalkane sulfonate in which the carbon atom carrying the nitro group also is bonded to hydrogen, permitting the pH of the system to change until the pH is within the range of 7 to 7.5 whereby the aci-nitro salt corresponding to said nitroalkane sulfonate is produced, halogenating said aci-nitro salt at a temperature of from 0°–5° C. with a halogen selected from the class consisting of chlorine, bromine, and iodine, and separating the resulting halogenated nitroalkane sulfonate from the mass.

PERCY B. POLEN.

REFERENCES CITED

The following references are of record in the file of this patent:

UNITED STATES PATENTS

| Number | Name | Date |
| --- | --- | --- |
| 2,401,269 | Nygaard et al. | May 28, 1946 |
| 2,477,869 | Gold et al. | Aug. 2, 1949 |

OTHER REFERENCES

Karrer, "Organic Chemistry," Nordemann Publishing Co., New York, N. Y., 1938, p. 123.

Chemical Reviews, "The Nitroparaffins," vol. 32, pp. 402–405, June 1943.

Ind. and Eng. Chem., "Recent Developments in Nitroparaffins," vol. 35, pp. 1149–1150, November, 1943.